(12) United States Patent
Huh et al.

(10) Patent No.: US 9,257,903 B2
(45) Date of Patent: Feb. 9, 2016

(54) PUMPING CIRCUIT

(71) Applicant: SK hynix Inc., Icheon-si Gyeonggi-do (KR)

(72) Inventors: Hwang Huh, Cheongju-si (KR); Won Beom Choi, Suwon-si (KR)

(73) Assignee: SK Hynix Inc., Gyeonggi-do (KR)

( * ) Notice: Subject to any disclaimer, the term of this patent is extended or adjusted under 35 U.S.C. 154(b) by 5 days.

(21) Appl. No.: 14/296,741

(22) Filed: Jun. 5, 2014

(65) Prior Publication Data

US 2015/0188418 A1 Jul. 2, 2015

(30) Foreign Application Priority Data

Jan. 2, 2014 (KR) .................. 10-2014-0000236

(51) Int. Cl.
*G05F 1/10* (2006.01)
*H02M 3/07* (2006.01)

(52) U.S. Cl.
CPC ........ *H02M 3/073* (2013.01); *H02M 2003/077* (2013.01)

(58) Field of Classification Search
CPC ...................................................... H02M 3/07
See application file for complete search history.

(56) References Cited

U.S. PATENT DOCUMENTS

2012/0139622 A1* 6/2012 Ryu, II .................... 327/536

FOREIGN PATENT DOCUMENTS

KR 1020100028193 A 3/2010

* cited by examiner

*Primary Examiner* — Daniel Puentes
(74) *Attorney, Agent, or Firm* — William Park & Associates Ltd.

(57) ABSTRACT

A pumping circuit includes a cross-coupled charge pump circuit including first and second capacitors configured to pump an input voltage in response to a first clock signal and to an inverted first clock signal and a plurality of transistors configured to one of transfer the input voltage to the first and second capacitors and to transfer a pumping voltage to an output node, and a switching voltage supply circuit configured to supply switching voltages to gates of the plurality of transistors to enable the transfer of the input voltage and the pumping voltage.

17 Claims, 7 Drawing Sheets

PUMPING CIRCUIT

CROSS-REFERENCE TO RELATED APPLICATION

The present application claims priority to Korean patent application number 10-2014-0000236 filed on Jan. 2, 2014, in the Korean Intellectual Property Office, the entire disclosure of which is incorporated by reference herein.

BACKGROUND

1. Technical Field

Various embodiments relate generally to a pumping circuit and, more particularly, to a pumping circuit configured to generate a relatively high voltage.

2. Related Art

A pumping circuit typically generates a relatively high voltage using a capacitor. The generated voltage is transferred via a switching device, such as for example a transistor. If a gate voltage of the transistor changes during the generation and transfer of the relatively high voltage the resistance of the transistor may change. As a result, a level of the relatively high voltage being transferred may be reduced.

BRIEF SUMMARY

Various embodiments relate to a pumping circuit capable of improving operating characteristics.

An embodiment of a pumping circuit may include a cross-coupled charge pump circuit including first and second capacitors configured to pump an input voltage in response to a first clock signal and an inverted first clock signal and a plurality of transistors configured to one of transfer the input voltage to the first and second capacitors and to transfer a pumping voltage to an output node, and a switching voltage supply circuit configured to supply switching voltages to gates of the plurality of transistors to enable the transfer of the input voltage and the pumping voltage.

DETAILED DESCRIPTION

Various embodiments will be described with reference to the accompanying drawings.

Figure 1:
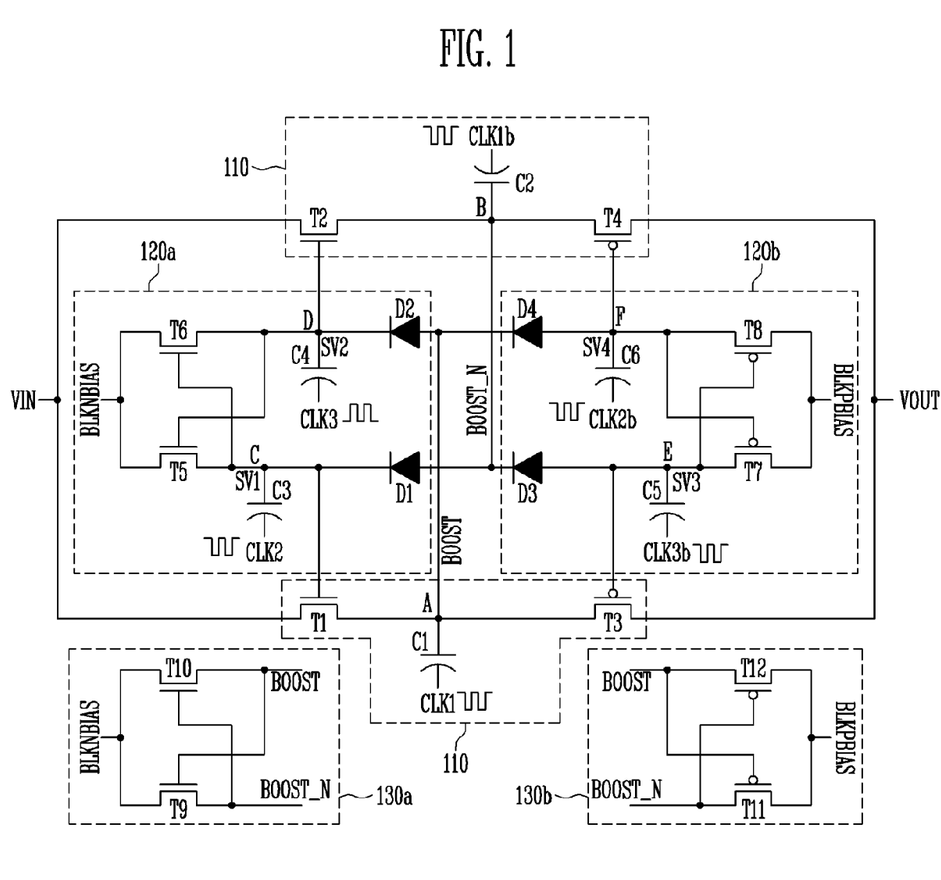
FIG. 1 is a circuit diagram representation of an embodiment of a pumping circuit.

Referring to FIG. 1 a circuit diagram representation of an embodiment of a pumping circuit is shown.

The pumping circuit may include a cross-coupled charge pump circuit 110 and switching voltage supply circuits 120a, 120b.

The cross-coupled charge pump circuit 110 may include a plurality of transistors and a plurality of capacitors. For example, the cross-coupled charge pump circuit 110 may include first and second capacitors C1, C2 configured to pump an input voltage in response to a first clock signal CLK1 and an inverted first clock signal CLKb1, respectively. The transistors T1, T2, T3, T4 may be configured to transfer the input voltage to the first and second capacitors C1, C2 or to transfer a pumping voltage to an output node VOUT.

The cross-coupled charge pump circuit 110 may include the first, second, third and fourth transistors T1, T2, T3, T4 and the first and second capacitors C1, C2. The first transistor T1 may be electrically coupled between an input node VIN and a first node A. The first transistor T1 may be configured to transfer the input voltage supplied to the first capacitor C1 in response to a first switching voltage SV1 received from the switching voltage supply circuit 120a. The second transistor T2 may be electrically coupled between the input node VIN and a second node B. The second transistor T2 may be configured to transfer the input voltage to the second capacitor C2 in response to a second switching voltage SV2 received from the switching voltage supply circuit 120a. The first and second transistors T1, T2 may be NMOS transistors.

The third transistor T3 may be electrically coupled between the first node A and the output node VOUT. The third transistor T3 may be configured to transfer a pumping voltage at the first node A to the output node VOUT in response to a third switching voltage SV3 received from the switching voltage supply circuit 120b. The fourth transistor T4 may be electrically coupled between the second node B and the output node VOUT. The fourth transistor T4 may be configured to transfer a pumping voltage at the second node B to the output node VOUT in response to a fourth switching voltage SV4 received from the switching voltage supply circuit 120b. The third and fourth transistors T3, T4 may be PMOS transistors.

The first capacitor C1 may be electrically coupled to the first node A. The first capacitor C1 may be configured to generate a first pumping voltage by pumping a voltage at the first node A in response to the first clock signal CLK1. The second capacitor C2 may be electrically coupled to the second node B. The second capacitor C2 may be configured to generate a second pumping voltage by pumping a voltage at the second node B in response to the inverted first clock signal CLKb1.

When the input voltage VIN is transferred to the first node A and the first pumping voltage is transferred to the output node VOUT, the switching voltage supply circuit 120a may supply the switching voltage SV1 to the gate of the first transistor T1 and the switching voltage supply circuit 120b may supply the switching voltage SV3 to the gate of the third transistor T3. When the input voltage VIN is transferred to the second node B and the second pumping voltage is transferred to the output node VOUT, the switching voltage supply circuit 120a may supply the switching voltages SV2 to the gate of the second transistor T2 and the switching voltage supply circuit 120b may supply the switching voltages SV4 to a gate of the fourth transistor T4.

The switching voltage supply circuit may include the first switching voltage supply circuit 120a and the second switching voltage supply circuit 120b. The first switching voltage supply circuit 120a may supply the first switching voltage SV1 to the first transistor T1 to enable the transfer of the input voltage VIN to node A and the second switching voltage SV2 to the second transistor T2 to enable the transfer of the input voltage VIN to node B. The second switching voltage supply circuit 120b may supply the third switching voltage SV3 to the third transistor T3 to enable the transfer of the pumping voltage from node A to VOUT and the fourth switching voltage SV4 to the fourth transistor T4 to enable the transfer of the pumping voltage from node B to VOUT.

The first switching voltage supply circuit 120a may operate in response to the second clock signal CLK2 and a third clock signal CLK3. The first switching voltage supply circuit 120a may supply the first switching voltage SV1 to the first transistor T1 in response to the second clock signal CLK2 and supply the second switching voltage SV2 to the second transistor T2 in response to the third clock signal CLK3. In other words, the first switching voltage supply circuit 120a may generate the first switching voltage SV1 in response to the second clock signal CLK2 and may generate the second switching voltage SV2 in response to the third clock signal CLK3.

The second switching voltage supply circuit 120b may supply the third switching voltage SV3 to the third transistor T3 in response to an inverted third clock signal CLK3b and may supply the fourth switching voltage SV4 to the fourth transistor in response to an inverted second clock signal CLK2b. In other words, the second switching voltage supply circuit 120b may generate the third switching voltage SV3 in response to the inverted third clock signal CLK3b and may generate the fourth switching voltage SV4 in response to the inverted second clock signal CLK2b.

Figure 2:
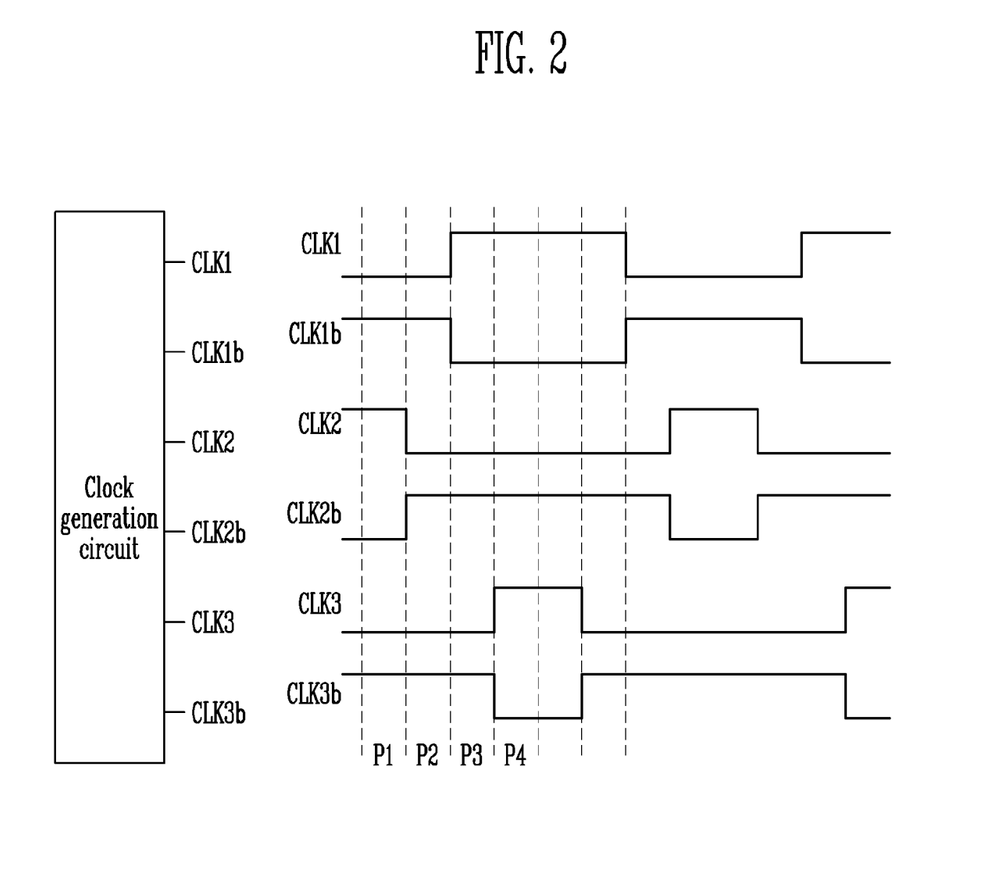
FIG. 2 is a timing diagram illustrating the relative timing of the clock signals shown in FIG. 1.

FIG. 2 is a timing diagram illustrating the timing of the clock signals shown in FIG. 1.

A clock generation circuit may generate the clock signals CLK1, CLK2, CLK3, CLK1b, CLK2b, CLK3b. A high-level pulse width and a low-level pulse width of the first clock signal CLK1 may be substantially equal to each other. A high-level pulse width the second clock signal CLK2 may be relatively smaller than a low-level pulse width of the second clock signal CLK2. A high-level pulse width of the third clock signal CLK3 may be relatively smaller than a low-level pulse width of the third clock signal CLK3. The timing of the high-level pulse of the second clock signal CLK2 may overlap the timing of the low-level pulse of the first clock signal CLK1. The timing of the high-level pulse of the third clock signal CLK3 may overlap the timing of the high-level pulse of the first clock signal CLK1. The second clock signal CLK2 and the third clock signal CLK3 may become low levels at a rising edge or a falling edge of the first clock signal CLK1. The first, second and third clock signals CLK1, CLK2, CLK3 may have the substantially the same period.

Referring back to FIG. 1, the switching voltage supply circuit 120a may turn off the first and second transistors T1, T2 during the transition of the first clock signal CLK1 from one level to another level and the switching voltage supply circuit 120b may turn off the third and fourth transistors T3, T4 during transition of the first clock signal CLK1 from one level to the another level.

When the first transistor T1 enables the transfer of the input voltage from the input node VIN to the first capacitor C1 and the second transistor T2 enables the transfer of the pumping voltage from the second capacitor C2 to the output node VOUT, the first and second switching voltage supply circuits 120a, 120b may turn on the first and fourth transistors T1, T4 and may turn off the second and third transistors T2, T3. When the second transistor T2 enables the transfer of the input voltage from the input node VIN to the second capacitor C2 and the third transistor T3 enables the transfer of the pumping voltage from the first capacitor C1 to the output node VOUT, the first and second switching voltage supply circuits 120a, 120b may turn on the second and third transistors T2, T3 and turn off the first and fourth transistors T1, T4.

The first switching voltage supply circuit 120a may include first and second diodes D1, D2, fifth and sixth transistors T5, T6, and third and fourth capacitors C3, C4. The first diode D1 may be electrically coupled to the second capacitor C2. An anode of the first diode D1 may be electrically coupled to the second capacitor C2. The second diode D2 may be electrically coupled to the first capacitor C1. An anode of the second diode D2 may be electrically coupled to the first capacitor C1. The fifth and sixth transistors T5, T6 may be electrically coupled between the second and first and second diodes D1 and D2. The fifth and sixth transistors may be NMOS transistors. A gate of the fifth transistor T5 may be electrically coupled to a cathode of the second diode D2. A gate of the sixth transistor T6 may be electrically coupled to a cathode of the first diode D1. The third capacitor C3 may be electrically coupled to a connecting node C, where the connecting node C may be electrically coupled to the first diode D1 and to the fifth transistor T5. The second clock signal CLK2 may be applied to the third capacitor C3. The fourth capacitor C4 may be electrically coupled to a connecting node D, where the connecting node D may be electrically coupled to the second diode D2 and to the sixth transistor T6. The third clock signal CLK3 may be applied to the fourth capacitor C4.

A first bias unit 130a may supply a relatively lower pumping voltage having a value between a value of a pumping voltage BOOST supplied by the first capacitor C1 and a value of a pumping voltage BOOST_N supplied by the second capacitor C2 to a connecting node between the fifth and sixth transistors T5, T6. The first bias unit 130a may include ninth and tenth transistors T9, T10. The ninth and tenth transistors T9, T10 may be NMOS transistors. The ninth transistor T9 may be electrically coupled to a connecting node between the second capacitor C2 and the fifth and sixth transistors T5, T6 in order to transfer the second pumping voltage BOOST_N and to operate in response to the first pumping voltage BOOST. The tenth transistor T10 may be electrically coupled to a connecting node between the first capacitor C1 and the fifth and sixth transistors T5, T6 in order to transfer the first pumping voltage BOOST and to operate in response to the second pumping voltage BOOST_N.

The second switching voltage supply circuit 120b may include third and fourth diodes D3, D4, seventh and eighth transistors T7, T8 and fifth and sixth capacitors C5, C6. The third diode D3 may be electrically coupled to the second capacitor C2. A cathode of the third diode D3 may be electrically coupled to the second capacitor C2. The fourth diode D4 may be electrically coupled to the first capacitor C1. The cathode of the fourth diode D4 may be electrically coupled to the first capacitor C1. The seventh and eighth transistors T7, T8 may be electrically coupled between the third diode D3 and the fourth diode D4. The seventh and eighth transistors may be PMOS transistors. A gate of the seventh transistor T7 may be electrically coupled to an anode of the fourth diode D4. A gate of the eighth transistor T8 electrically coupled to an anode of the third diode D3. The fifth capacitor C5 may be electrically coupled to a connecting node E, where the connecting node E is electrically coupled to the third diode D3 and to the seventh transistor T7. The inverted third clock signal CLK3b may be applied to the fifth capacitor C5. The sixth capacitor C6 may be electrically coupled to a connecting node F, where the connecting node F is electrically coupled to the fourth diode D4 and to the eighth transistor T8. The inverted second clock signal CLK2*b* may be applied to the sixth capacitor C6.

A second bias unit 130*b* may supply a relatively higher pumping voltage having a value between a value of the pumping voltage BOOST supplied by the first capacitor C1 and a value of the pumping voltage BOOST_N supplied by the second capacitor C2 to a connecting node between the seventh and eighth transistors T7, T8. The second bias unit 130*b* may include eleventh and twelfth transistors T11, T12. The eleventh and twelfth transistors T11, T12 may be PMOS transistors. The eleventh transistor T11 may be electrically coupled to a connecting node between the second capacitor C2 and the seventh and eighth transistors T7, T8 in order to transfer the second pumping voltage BOOST_N and to operate in response to the first pumping voltage BOOST. The eleventh transistor T11 may be electrically coupled to a connecting node between the first capacitor C1 and the seventh and eighth transistors T7, T8 in order to transfer the first pumping voltage BOOST and to operate in response to the second pumping voltage BOOST_N.

Figure 3:
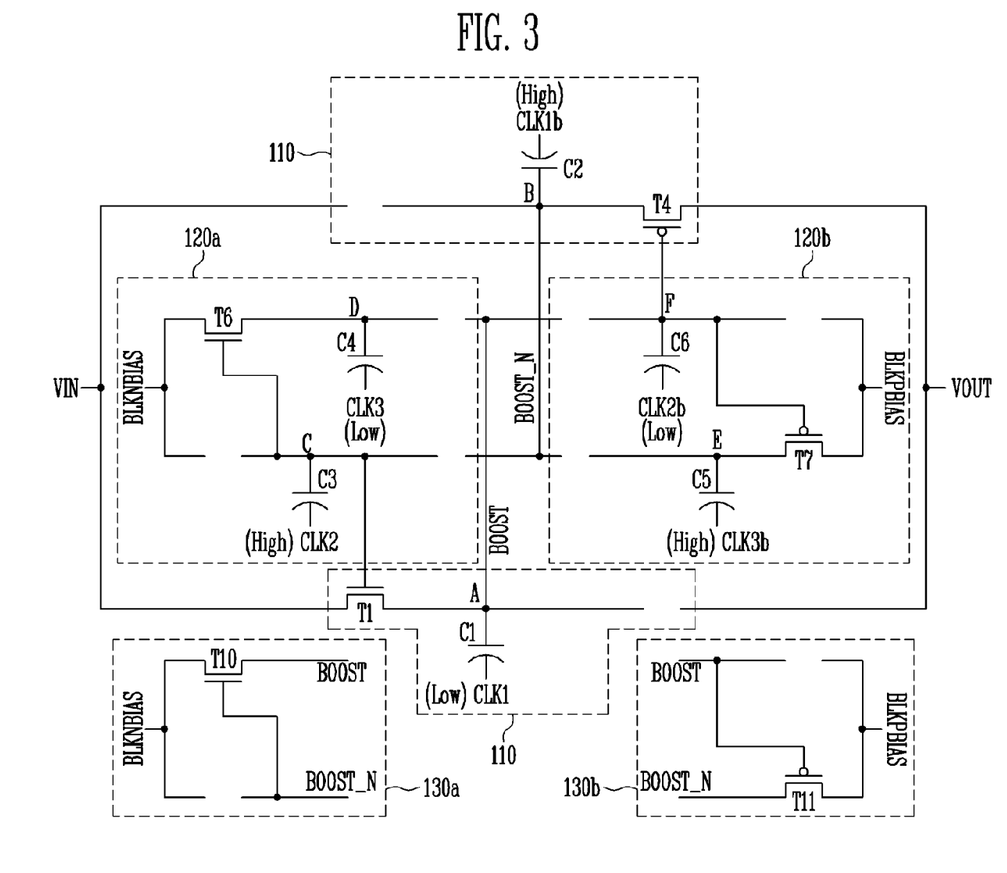
FIG. 3 is a circuit diagram representation of an embodiment of a pumping circuit during a first time period.

FIG. 3 is a circuit diagram representation of an embodiment of a pumping circuit during a first time period P1. Transistors and diodes that are turned off during the first time period P1 are represented as open circuits. Referring to FIGS. 2 and 3, during the first time period P1, the first clock signal CLK1 may be at a low level, the second clock signal CLK2 may be at a high level, and the third clock signal CLK3 may be at a low level. Therefore, during the time period P1, the inverted first clock signal CLK1*b* may be at a high level, the inverted second clock signal CLK2*b* may be at a low level, and the inverted third clock signal CLK3*b* be at a high level.

The second pumping voltage BOOST_N at the second node B may be relatively higher than the first pumping voltage BOOST at the first node A in response to the inverted first clock signal CLK1*b*. The second clock signal CLK2 may be applied to the third capacitor C3. The third capacitor C3 is electrically coupled to the node C. The potential at the node C may vary based on the second clock signal CLK2. The inverted second clock signal CLK2*b* may be applied to the sixth capacitor C6. The sixth capacitor C6 is electrically coupled to the node F. The potential at the node F may vary based on the inverted second clock signal CLK2*b*. The third clock signal CLK3 may be applied to the fourth capacitor C4. The fourth capacitor C4 is electrically coupled to the node D. The potential at the node D may vary based on the third clock signal CLK3. The inverted third clock signal CLK3*b* may be applied to the fifth capacitor C5. The fifth capacitor C5 is electrically coupled to the node E. The potential at the fifth node E may vary based on the inverted third clock signal CLK3*b*. The first, fourth, sixth and seventh transistors T1, T4, T6, T7 may be turned on, and the second, third, fifth and eighth transistors T2, T3, T5, T8 may be turned off, based on the potentials at the third, fourth, fifth and sixth nodes C, D, E, F. The first, second, third and fourth diodes D1, D2, D3, D4 may be turned off.

The input voltage at the input node VIN may be transferred to the first capacitor C1 through the first transistor T1. The second pumping voltage BOOST_N may be transferred to the output node VOUT through the fourth transistor T4.

Since the tenth transistor T10 is turned on, the first bias unit 130*a* may output the first pumping voltage BOOST at a relatively lower level than the second pumping voltage BOOST_N. Since the fifth transistor T5 is turned off, the operation of the first transistor T1 may not be affected. The first pumping voltage BOOST may be transferred to the fourth node D through the sixth transistor T6. Since the eleventh transistor T11 is turned on, the second bias unit 130*b* may output the second pumping voltage BOOST_N at a relatively higher level than the first pumping voltage BOOST. Since the eighth transistor T8 is turned off, the operation of the fourth transistor T4 may not be affected. The second pumping voltage BOOST_N may be transferred to the fifth node E through the seventh transistor T7.

When the first transistor T1 enables the transfer of the input voltage to the first capacitor C1 and the fourth transistor T4 enables the transfer the second pumping voltage BOOST_N to the output node VOUT, the first switching voltage supply circuit 120*a* may supply a relatively stable first switching voltage SV1 to the first transistor T1, and the second switching voltage supply circuit 120*b* may supply a relatively stable fourth switching voltage SV4 to the fourth transistor T4. The first switching voltage SV1 and fourth switching voltage SV4 are generated based on the second clock signal CLK2 and the inverted second clock signal CLK2*b*, respectively. The first switching voltage SV1 and fourth switching voltage SV4 are not affected by the first clock signal CLK1 or the pumping voltages BOOST and BOOST_N. Relatively stable first and fourth switching voltages SV1, SV4 may be supplied to the first and fourth transistors T1, T4, respectively. The input voltage and the pumping voltages may be transferred without significantly altering or increasing the turn-on resistances of the first and fourth transistors T1, T4.

Figure 4:
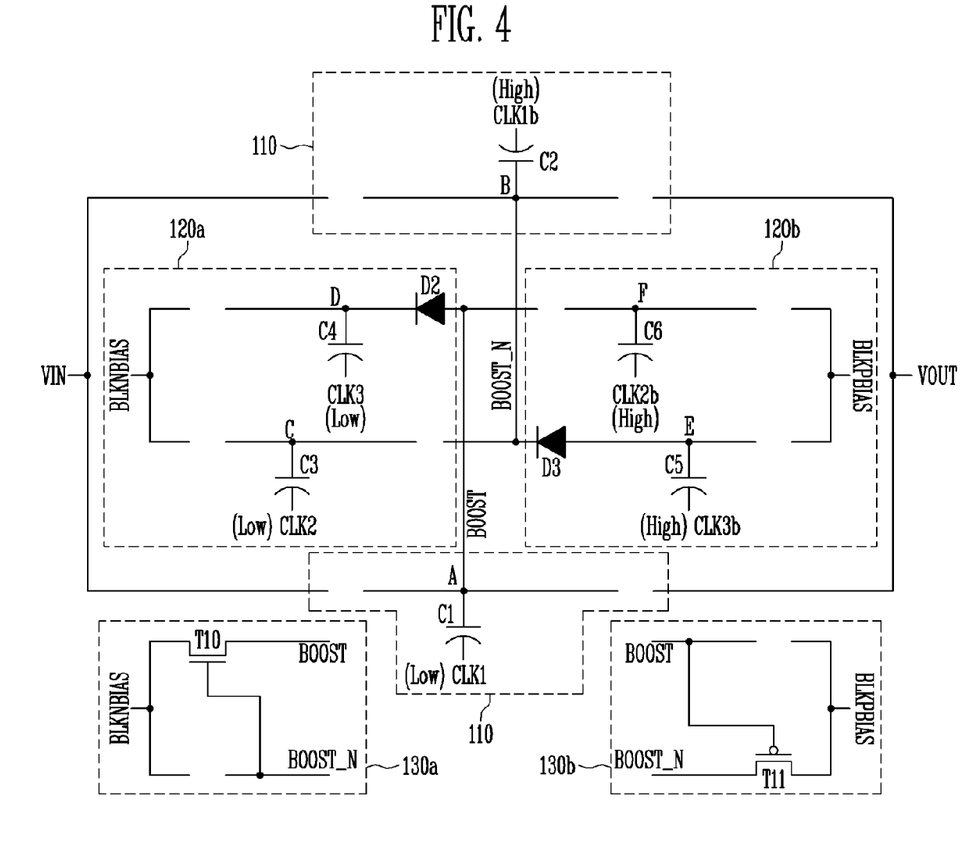
FIG. 4 is a circuit diagram representation of an embodiment of a pumping circuit during a second time period.

FIG. 4 is a circuit diagram representation of an embodiment of a pumping circuit during a second time period P2. Transistors and diodes that are turned off during the second time period P2 are represented as open circuits. Referring to FIGS. 2 and 4, during the second time period P2, the first clock signal CLK1 may be maintained at a low level, the second clock signal CLK2 may be changed to a low level, and the third clock signal CLK3 may be maintained at a low level. Therefore, during the second time period P2, each of the inverted first, second and third clock signals CLK1*b*, CLK2*b*, CLK3*b* may beat a high level.

The potentials at the third and fourth nodes C, D may be relatively lower, and the first, second, fifth and sixth transistors T1, T2, T5, T6 may be turned off based on the potentials at the third and fourth nodes C, D. The potentials at the fifth and sixth nodes E, F may be relatively higher, and the third, fourth, seventh and eighth transistors T3, T4, T7, T8 may be turned off based on the potentials at the fifth and sixth nodes E, F.

During the second time period P2, all the transistors T1, T2, T3, T4, T5, T6, T7, T8 included in the cross-coupled charge pump circuit 110 and the switching voltage supply circuits 120*a*, 120*b*, may be turned off and none of the voltages may be transferred. The first node A is electrically coupled to the first capacitor C1 and the second node B is electrically coupled to the second capacitor C2. The first and second nodes A, B may substantially be in a floating state.

Figure 5:
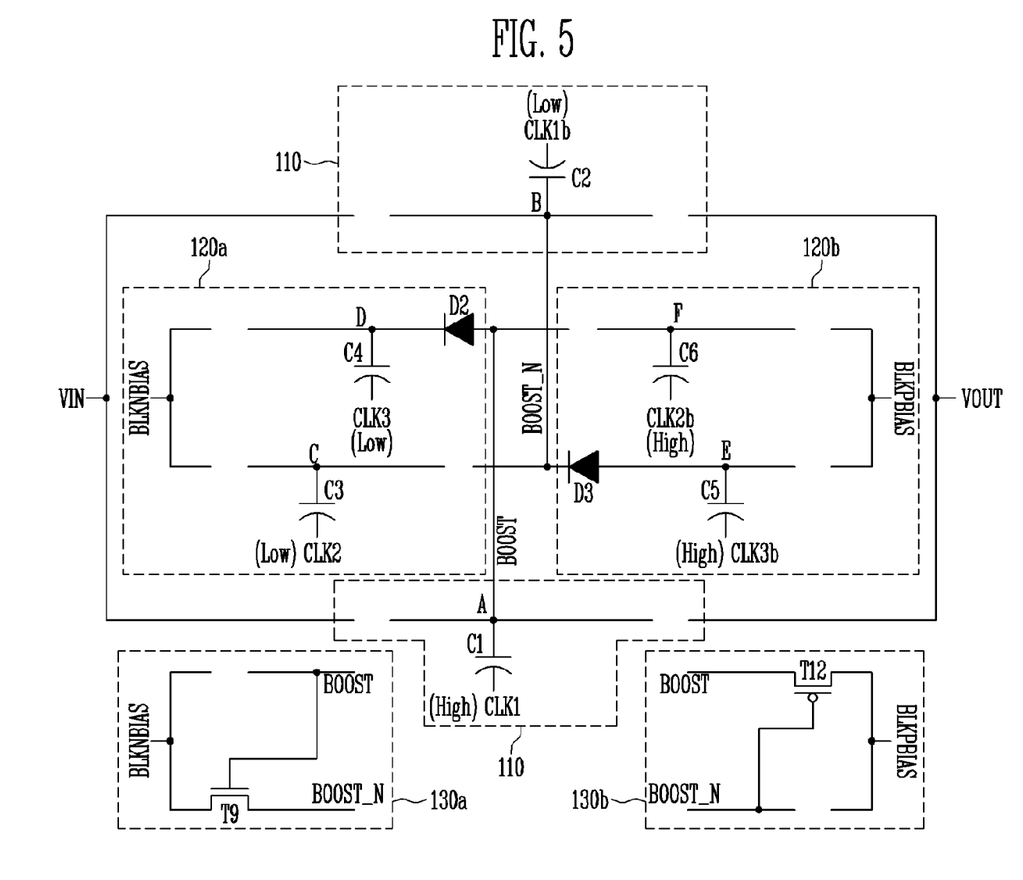
FIG. 5 a circuit diagram representation of an embodiment of a pumping circuit during a third time period.

FIG. 5 is a circuit diagram representation of an embodiment of a pumping circuit during a third time period P3. Transistors and diodes that are turned off during the third time period P3 are represented as open circuits. Referring to FIGS. 2 and 5, during the third time period P3, the first clock signal CLK1 may be changed to a high level, the second clock signal CLK2 may be maintained at a low level, and the third clock signal CLK3 may be maintained at a low level. Therefore, the inverted first clock signal CLK1*b* may be at a low level, the inverted second clock signal CLK2*b* may be at a high level, and the inverted third clock signal CLK3*b* may be at a high level.

In other words, during transition of the first clock signal CLK1 from a low level to a high level during the third time period P3, the level of the clock signals CLK2, CLK2b, CLK3, CLK3b may not change. As a result, the potentials at the third, fourth, fifth and sixth nodes C, D, E, F may not change, and the first, second, third, fourth, fifth, sixth, seventh and eighth transistors T1, T2, T3, T4, T5, T6, T7, T8 may remain turned-off.

In the above-described state, the first clock signal CLK1 and the inverted first clock signal CLK1b may transition from one level to another, and the input voltage transferred to the first node A may be pumped by the first capacitor C1 while the first and second nodes A, B are in the floating state. Therefore, the first pumping voltage BOOST may be relatively higher than the second pumping voltage BOOST_N.

Figure 6:
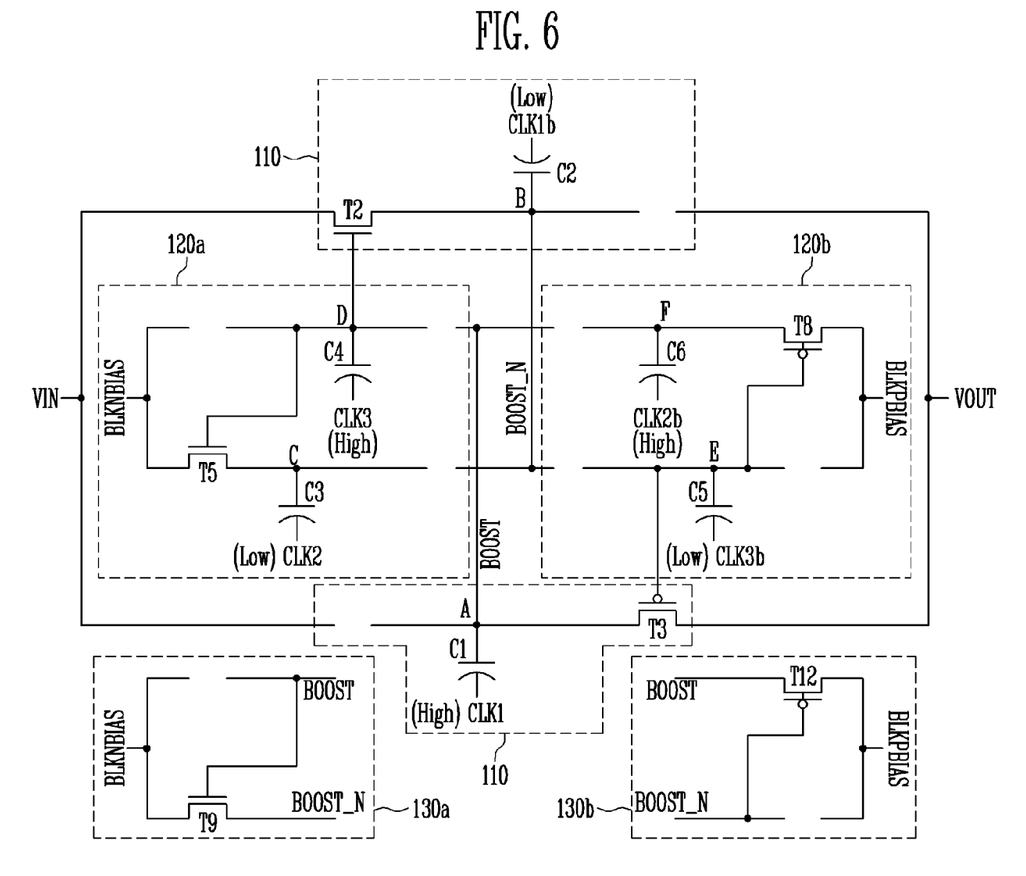
FIG. 6 a circuit diagram representation of an embodiment of a pumping circuit during a fourth time period.

FIG. 6 is a circuit diagram representation of an embodiment of a pumping circuit during a fourth time period P4. Transistors and diodes that are turned off during the fourth time period P4 are represented as open circuits. Referring to FIGS. 2 and 6, during the fourth time period P4, the first clock signal CLK1 may be maintained at a high level, the second clock signal CLK2 may be maintained at a low level, and the third clock signal CLK3 may be changed to a high level. Therefore, the inverted first clock signal CLK1b may be at a low level, the inverted second clock signal CLK2b may be at a high level, and the inverted third clock signal CLK3b may be at a low level.

The third, fourth, fifth and sixth nodes C, D, E, F are electrically coupled to the third, fourth, fifth and sixth capacitors C3, C4, C5, C6, respectively. The potentials at the third, fourth, fifth and sixth nodes C, D, E, F may vary based on the level of the clock signals CLK2, CLK3, CLK3b, and CLK2b, respectively. The first, fourth, sixth and seventh transistors T1, T4, T6, T7 may be turned off based on the potentials of the third, fourth, fifth and sixth nodes C, D, E, F. The second, third, fifth and eighth transistors T2, T3, T5, T8 may be turned on. All the diodes D1, D2, D3, D4 may be turned off.

The input voltage at the input node VIN may be transferred to the second capacitor C2 through the second transistor T2. The first pumping voltage BOOST1 is relatively higher than the second pumping voltage BOOST_N and may be transferred to the output node VOUT through the third transistor T3.

Since the ninth transistor T9 is turned on, the first bias unit 130a may output the second pumping voltage BOOST_N at a level that is relatively lower than the first pumping voltage BOOST. Since the sixth transistor T6 is turned off, the transfer operation performed by the second transistor T2 may not be affected. The second pumping voltage BOOST_N may be transferred to the third node C through the fifth transistor T5. Since the twelfth transistor T12 is turned on, the second bias unit 130b may output the first pumping voltage BOOST at a level that is relatively higher than the second pumping voltage BOOST_N. Since the seventh transistor T7 is turned off, the transfer operation performed by the third transistor T3 may not be affected. The first pumping voltage BOOST may be transferred to the sixth node F through the eighth transistor T8.

When the second transistor T2 enables the transfer of the input voltage to the second capacitor C2 and the third transistor T3 enables the transfer of the first pumping voltage BOOST to the output node VOUT, the first switching voltage supply circuit 120a may supply a relatively stable second switching voltage SV2 to the second transistor T2, and the second switching voltage supply circuit 120b may supply a relatively stable third switching voltage SV3 to the third transistor T3. The second switching voltage SV2 and the third switching voltage SV3 are generated based on the third clock signal CLK3 and the inverted third clock signal CLK3b, respectively. The second and third switching voltages SV2, SV3 may not be affected by the first clock signal CLK1 or the pumping voltages BOOST and BOOST_N. Relatively stable second and third switching voltages SV2, SV3 may be supplied to the second and third transistors T2, T3, respectively. The input voltage and the pumping voltages may be transferred without significantly changing or increasing the turn-on resistances of the second and third transistors T2, T3.

Figure 7:
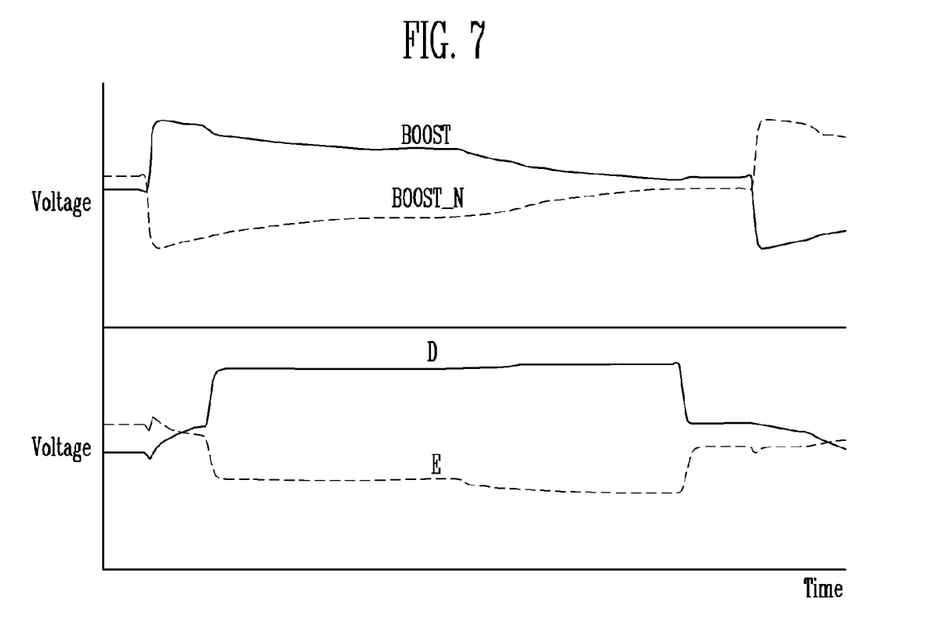
FIG. 7 is a graphical representation of the voltages at the fourth node, the fifth mode and the pumping voltages as function of time during the operation of an embodiment of a pumping circuit during the fourth period of time.

FIG. 7 is a graphical representation of the voltages at the fourth node D, the fifth mode E and the pumping voltages BOOST and BOOTS_N as function of time during the operation of an embodiment of a pumping circuit during the fourth period of time P4.

Referring to FIGS. 6 and 7, during the fourth period of time P4, the fourth node D and the fifth node E may be maintained at predetermined levels even when the pumping voltages BOOST and BOOTS_N are changed. Since the fourth node D and the fifth node E are maintained at the predetermined levels, the second and third transistors T2, T3 may remain turned-on in a relatively stable manner, and the turn on resistances may not change or increase by a significant amount. The transistors may perform the transfer operations in a relatively stable manner.

Since the transistors transfer the input voltage and the pumping voltage without a significant voltage drop, the sizes of the pumping capacitors C1, C2 may be reduced to a relatively lower capacitance.

While certain embodiments have been described above, it will be understood to those skilled in the art that the embodiments described are by way of example only. Accordingly, the pumping circuits described herein should not be limited based on the described embodiments. Rather, the pumping circuits described herein should only be limited in light of the claims that follow when taken in conjunction with the above description and accompanying drawings.

What is claimed is:

1. A pumping circuit, comprising:
   a cross-coupled charge pump circuit including first and second capacitors configured to pump an input voltage in response to a first clock signal and to an inverted first clock signal and a plurality of transistors configured to one of transfer the input voltage to the first and second capacitors and transfer a pumping voltage to an output node; and
   a switching voltage supply circuit configured to supply switching voltages to gates of the plurality of transistors to enable the transfer of the input voltage and the pumping voltage,
   wherein the switching voltage supply circuit includes a first switching voltage supply unit which generates the switching voltages in response to a second clock and a third clock and a second switching voltage supply unit which generates the switching voltages in response to an inverted second clock and an inverted third clock.

2. The pumping circuit of claim 1, wherein the cross-coupled charge pump circuit comprises:
   a first one of the plurality of transistors configured to enable a transfer of the input voltage to the first capacitor in response to a first switching voltage received from the switching voltage supply circuit;
   a second one of the plurality of transistors configured to enable a transfer of the input voltage to the second capacitor in response to a second switching voltage received from the switching voltage supply circuit;
   a third one of the plurality of transistors configured to enable a transfer of a first pumping voltage generated by the first capacitor to the output node in response to a third switching voltage received from the switching voltage supply circuit; and a fourth one of the plurality of transistors configured to enable a transfer of a second pumping voltage generated by the second capacitor to the output node in response to a fourth switching voltage received from the switching voltage supply circuit, wherein the first capacitor is configured to generate the first pumping voltage in response to the first clock signal, and wherein the second capacitor is configured to generate the second pumping voltage in response to the inverted first clock signal.

3. The pumping circuit of claim 2, wherein the first switching voltage supply unit configured to generate the first switching voltage in response to a second clock signal and to generate the second switching voltage in response to a third clock signal; and the second switching voltage supply unit configured to generate the third switching voltage in response to an inverted second clock signal and to generate the fourth switching voltage in response to an inverted third clock signal.

4. The pumping circuit of claim 3, wherein a high-level pulse width of each of the second and third clock signals is relatively smaller than a low-level pulse width of each of the second and third clock signals, wherein a timing of the high-level pulse of the second clock signal overlaps a timing of a low-level pulse of the first clock signal, and wherein a timing of the high-level pulse of the third clock signal overlaps a timing of a high-level pulse of the first clock signal.

5. The pumping circuit of claim 2, wherein the switching voltage supply circuit is configured to turns off the first, second, third and fourth transistors during a transition of the first clock signal from a first level to a second level.

6. The pumping circuit of claim 1, wherein the first switching voltage supply unit configured to generate a first switching voltage operable to enable a first one of the plurality of transistors to enable a transfer of the input voltage to the first capacitor in response to a second clock signal and to generate a second switching voltage operable to enable a second one of the plurality of transistors to enable a transfer of the input voltage to the second capacitor in response to a third clock signal; and the second switching voltage supply unit configured to generate a third switching voltage operable to enable a third one of the plurality of transistors to enable a transfer of the input voltage to the first capacitor in response to the inverted second clock signal and to generated a fourth switching voltage operable to enable a fourth one of the plurality of transistors to transfer the input voltage to the second capacitor in response to an inverted third clock signals.

7. The pumping circuit of claim 6, wherein a high-level pulse width of each of the second and third clock signals is relatively smaller than a low-level pulse width of the second and third clock signals, wherein a timing of the high-level pulse of the second clock signal overlaps a timing of a low-level pulse of the first clock signal, and wherein a timing of the high-level pulse of the third clock signal overlaps a timing of a high-level pulse of the first clock signal.

8. The pumping circuit of claim 6, wherein the first and second switching voltage supply units are configured to turn off the transistors during a transition of the first clock signal from a first level to a second level.

9. The pumping circuit of claim 6, wherein the first and second switching voltage supply units are configured to turn on the first and fourth transistors and to turn off the second and third transistors when the input voltage is transferred to the first capacitor and the pumping voltage generated by the second capacitor is transferred to the output node.

10. The pumping circuit of claim 6, wherein the first and second switching voltage supply units are configured to turn on the second and third transistors and to turn off the first and fourth transistors when the input voltage is transferred to the second capacitor and the pumping voltage generated by the first capacitor is transferred to the output node.

11. The pumping circuit of claim 6, wherein the first switching voltage supply unit comprises:

a first diode electrically coupled to the first capacitor;
a second diode electrically coupled to the second capacitor;
fifth and sixth transistors electrically coupled between the second and first diodes;
a third capacitor electrically coupled to a connecting node between the first diode and the fifth transistor, wherein the second clock signal is applied to the third capacitor; and
a fourth capacitor electrically coupled to a connecting node between the second diode and the sixth transistor, wherein the third clock signal is applied to the fourth capacitor,
wherein a gate of the fifth transistor is electrically coupled to the fourth capacitor and a gate of the sixth transistor is electrically coupled to the third capacitor.

12. The pumping circuit of claim 11, further comprising a first bias unit configured to supply a relatively lower pumping voltage having a value between the value of the pumping voltage of the first capacitor and the value of the pumping voltage of the second capacitor to a connecting node between the fifth and sixth transistors.

13. The pumping circuit of claim 6, wherein the second switching voltage supply unit comprises:

a third diode electrically coupled to the second capacitor;
a fourth diode electrically coupled to the first capacitor;
seventh and eighth transistors electrically coupled between the third and fourth diodes;
a fifth capacitor electrically coupled to a connecting node between the third diode and the seventh transistor, wherein the inverted third clock signal is applied to the fifth capacitor; and
a sixth capacitor electrically coupled to a connecting node between the fourth diode and the eighth transistor, wherein the inverted second clock signal is applied to the sixth capacitor,
wherein a gate of the seventh transistor is electrically coupled to the sixth capacitor and a gate of the eighth transistor is electrically coupled to the fifth capacitor.

14. The pumping circuit of claim 13, further comprising a first bias unit configured to supply a relatively lower pumping voltage having a value between a value of the pumping voltage generated by the first capacitor and a value of the pumping voltage generated by the second capacitor to a connecting node between the fifth and sixth transistors.

15. The pumping circuit of claim 1, wherein the switching voltage supply circuit is configured to supply the switching voltages to the gates of the transistors in response to second and third clock signals.

16. The pumping circuit of claim 15,
wherein a high-level pulse width of each of the second and third clock signals is relatively smaller than a low-level pulse width thereof,
wherein a timing of the high-level pulse of the second clock signal overlaps a timing of a low-level pulse of the first clock signal, and
wherein a timing of the high-level pulse of the third clock signal overlaps a timing of a high-level pulse of the first clock signal.

17. The pumping circuit of claim 1, wherein the switching voltage supply circuit is configured to turn off the transistors of the cross-coupled charge pump circuit during a transition of the first clock signal from a first level to a second level.

* * * * *